(12) United States Patent
Yamamoto

(10) Patent No.: US 11,050,370 B2
(45) Date of Patent: Jun. 29, 2021

(54) METHOD FOR DETECTING MAGNETIC FIELD LOCATION IN ELECTRIC MOTOR

(71) Applicant: HOKUTO CONTROL Co., Ltd., Nagano (JP)

(72) Inventor: Kiyoshi Yamamoto, Nagano (JP)

(73) Assignee: HOKUTO CONTROL CO., LTD., Nagano (JP)

( * ) Notice: Subject to any disclaimer, the term of this patent is extended or adjusted under 35 U.S.C. 154(b) by 35 days.

(21) Appl. No.: 16/331,784

(22) PCT Filed: Nov. 8, 2017

(86) PCT No.: PCT/JP2017/040314
§ 371 (c)(1),
(2) Date: Mar. 8, 2019

(87) PCT Pub. No.: WO2018/088442
PCT Pub. Date: May 17, 2018

(65) Prior Publication Data
US 2019/0253009 A1 Aug. 15, 2019

(30) Foreign Application Priority Data
Nov. 8, 2016 (JP) .............................. JP2016-218008

(51) Int. Cl.
*H02P 23/14* (2006.01)
*H02P 6/14* (2016.01)
*H02P 6/15* (2016.01)
*H02P 6/18* (2016.01)

(52) U.S. Cl.
CPC ............... *H02P 6/153* (2016.02); *H02P 6/18* (2013.01)

(58) Field of Classification Search
CPC ............. H02P 6/34; H02P 21/06; H02P 25/22
See application file for complete search history.

(56) References Cited

U.S. PATENT DOCUMENTS 5,569,990 A   10/1996   Dunfield
9,543,865 B2   1/2017   Hano
(Continued)

FOREIGN PATENT DOCUMENTS

EP   2790316   10/2014
JP   2006254626   9/2006
JP   2011125120   6/2011

OTHER PUBLICATIONS

International Search Report for PCT/JP2017/040314, dated Feb. 20, 2018.
(Continued)

*Primary Examiner* — Kawing Chan
*Assistant Examiner* — Charles S Laughlin
(74) *Attorney, Agent, or Firm* — Stephen J. Weyer, Esq.; Stites & Harbison, PLLC

(57) ABSTRACT

The present invention addresses the problem of providing a method for detecting a magnetic field location in an electric motor, said method making it possible to lower costs using simple hardware and software, and instantaneously detect permanent-magnet field location. As a means for solving said problem, an MPU (51) sequentially selects one from six conduction patterns using a phase at which one-phase conduction occurs without branching at a neutral point among three-phase coils as a phase to be measured, applies a sensing current to the three-phase coils, and uses a timer (56) to measure a pulse-width time until the coil current detected by a current sensor (53) reaches a current threshold, and stores the same as measurement data. Following the forward-direction conduction pattern, a reverse-direction conduction pattern is selected and a current is applied to the phase to be measured, after which the same conduction pattern is repeated for the remaining two phases, whereby a current is applied for all six conduction patterns. Conduction times are stored as measurement data, and the permanent-
(Continued)

magnet field location are identified from the field location information corresponding to the conduction pattern having the shortest conduction time among the measurement data of the conduction times corresponding to the six conduction patterns.

8 Claims, 8 Drawing Sheets

(56) References Cited

U.S. PATENT DOCUMENTS

| | | |
|---|---|---|
| 9,707,825 B2 | 7/2017 | Najima |
| 2004/0004455 A1* | 1/2004 | Fujimoto ............... H02P 6/20 318/474 |
| 2006/0006833 A1* | 1/2006 | Koczara ............... H02P 6/185 318/800 |
| 2006/0022623 A1 | 2/2006 | Inaba et al. |
| 2012/0181963 A1* | 7/2012 | Wang ................... H02P 6/22 318/400.33 |
| 2013/0193899 A1* | 8/2013 | Kurosawa ............. H02P 6/20 318/504 |
| 2014/0232311 A1 | 8/2014 | Hill |
| 2016/0233803 A1* | 8/2016 | Hano ................... H02P 6/188 |

OTHER PUBLICATIONS

Written Opinion of the International Searching Authority for PCT/JP2017/040314, dated Feb. 20, 2018.
Supplementary European Search Report dated Jan. 22, 2020 in corresponding European Patent Application 17868543.4.

* cited by examiner

METHOD FOR DETECTING MAGNETIC FIELD LOCATION IN ELECTRIC MOTOR

TECHNICAL FIELD

The present invention relates to a method for detecting a magnetic field location in an electric motor, e.g., sensorless motor, linear actuator.

BACKGROUND ART

Conventionally, motors having brushes have been used as small DC motors, but they have problems of brush noise, electric noise, low durability, etc., so brushless motors have been developed to solve the problems. These days, sensorless motors, which have no location sensors, draw attention as compact, light, tough and low-cost motors, and they were firstly employed in information technology devices, e.g., hard disk drive unit, and then employed in home electric appliances, car-mounted devices, etc. due to progression of vector control technology.

A three-phase brushless direct current (DC) motor is shown in FIG. 8 as an example of a sensorless motor having no location sensor. A rotor 2 is capable of rotating about a rotor shaft 1 and has a permanent magnet 3 having a pair of magnetic poles, i.e., S-pole and N-pole. A type of magnetic pole structure (IPM, SPM) and a number of magnetic poles may be optionally selected. In a stator 4, armature coils (coils) U, V and W are formed on pole teeth, which are provided with a phase difference of 120°, and they are star-connected through a common point C.

An example of a block diagram of a conventional sensorless drive circuit is shown in FIG. 9. MOTOR is a three-phase sensorless motor. An MPU 51 is a microcontroller (control means). An INV 52 is an inverter circuit (output means) having a three-phase half bridge structure. An RS 53 is a current sensor. An ADC 54 is an A/D converter for converting a current value into a digital value. Note that, an actual circuit further has an electric source, an input part of a location sensor, a zero-cross comparator, a dummy common producing part, a host interface part, etc. which are omitted for easy explanation.

A timing chart of a typical example of 120° conduction for driving the three-phase brushless motor is shown in FIG. 10. In a section 1, rectangular-wave conduction is performed from the U-phase to the V-phase; in a section 2, rectangular-wave conduction is performed from the U-phase to the W-phase; in a section 3, rectangular-wave conduction is performed from the V-phase to the W-phase; in a section 4, rectangular-wave conduction is performed from the V-phase to the U-phase; in a section 5, rectangular-wave conduction is performed from the W-phase to the U-phase; and in a section 6, rectangular-wave conduction is performed from the W-phase to the V-phase. Dotted lines are waveforms of induced voltages. HU to HW are waveforms of outputs of hall sensors provided in the motor, and excitation-switching in the conventional brushless DC motor having the location sensor is performed on the basis of signals of the sensors.

In the sensorless driving manner, locations of the rotor are detected on the basis of the induced voltages, but the rotor cannot be started when a speed is zero because no voltages are induced and the location of the rotor cannot be detected. To detect the location of the stopped rotor, the coil current sensor and the current detecting circuit are provided as shown in FIG. 9, and the location of the rotor can be estimated by current response which is caused by applying sine-wave coil currents to the coils by a PWM driving manner using the inverter. Prior arts, in each of which coil currents are detected by a current sensor and a current detecting circuit, are disclosed in the following literatures.

CITATION LIST

Patent Literature

Patent Literature 1: Japanese Laid-open Patent Publication No. 2006-254626
Patent Literature 2: Japanese Laid-open Patent Publication No. 2014-503170

SUMMARY OF INVENTION

Technical Problem

In the sensorless driving manner, the location of the rotor cannot be detected when the rotor stops or rotates at a low speed, so a setup starting manner, in which the rotor is compulsorily located by stationary excitation then the rotational speed is increased by an open loop system, is widely employed. However, in this manner, locating the rotor must be performed with a large current, and it takes a long time to locate the rotor, so starting the rotor must be delayed. A large reverse rotation will occur when locating the rotor at some static positions, so use application of the motor is limited, and the motor often cannot be used in a reciprocating mechanism and a rotation mechanism in which a rotor is rotated by an external force. Further, the manner is weak against viscous load and load fluctuation, and the rotation easily steps out.

Thus, as described in BACKGROUND ART, the location of the rotor is detected by a high frequency wave injection manner, in which the location of the rotor is estimated, from coil current profiles, by applying sensing pulses, e.g., large current sine waves. However, in this manner, three current sensors and a high-speed A/D converter capable of simultaneously sampling three phases are required, and a differential amplifier is further required for high precision measurement, so the detection circuit must be complexed. To calculate an estimated location of a rotor, a mathematical model is used, so an MPU (microprocessor) having high calculation performance is required. Therefore, the method and the device employing the manner must be complexed, and a production cost must be increased. Further, the manner has further problems that the sensing current is large and that it takes several dozen milliseconds to detect the location of the rotor.

The present invention addresses the problem of providing a method for detecting a magnetic field location in an electric motor, the method making it possible to lower costs using simple hardware and software, and instantaneously detect permanent-magnet field location.

Solution to Problem

The method detects a magnetic field location in an electric motor, which comprises a rotor having permanent-magnet field and a stator having star-connected three-phase coils and which is started by 120° rectangular-wave conduction supplied from a constant-voltage DC source, the electric motor further comprises: output means for feeding electricity to the three-phase coils through a three-phase half bridge inverter circuit; control means for storing six conduction patterns, which are forward-direction conduction patterns and reverse-direction conduction patterns for each of the three-phase coils, and field location information for assigning excitation switching sections of 120° conduction corresponding to each of the conduction patterns, and switching-controlling the output means, according to a rotation command from a superordinate controller, so as to change an exciting state; current detecting means for detecting a coil current, the current detecting means being connected to an earth-side terminal of the output means; comparator means for comparing a detecting voltage corresponding to the coil current detected by the current detecting means with a reference voltage corresponding to a current threshold capable of detecting magnetic resistance change caused by magnetic field polarity so as to detect that the coil current reaches the current threshold; and timer means for measuring a pulse-width time from starting to apply sensing conduction to the three-phase coils until the coil current detected by the comparator means reaches the current threshold, and the method comprises: a conduction-off step in which all output of the output means to the three-phase coils is blocked immediately before applying the sensing conduction and stored energies stored in all of the coils are released so as to produce a period of a zero current state where the coil current is zero; a measuring step in which the control means sequentially selects one from six conduction patterns using a phase at which one-phase conduction occurs without branching at a neutral point among three-phase coils as a phase to be measured, applies constant-voltage rectangular pulses for sensing to the three-phase coils, uses the timer means to measure a pulse-width time until the coil current detected by the current detecting means reaches the current threshold, and stores the same as measurement data; a storing step in which following the forward-direction conduction pattern, a reverse-direction conduction pattern is selected and a current is applied to the phase to be measured, after which the same conduction pattern is repeated for the remaining two phases, whereby the sensing conduction is repeatedly applied for all six conduction patterns, and pulse-width times are repeatedly measured and stored as measurement data, and the control means identifies the permanent-magnet field location from the field location information corresponding to the conduction pattern having the shortest conduction time among the measurement data of the conduction times corresponding to the six conduction patterns.

In the above described method, the three-phase sensing pulses (the constant-voltage rectangular pulses) are sequentially applied to the three-phase coils in a stationary state of the motor, and the conduction time of the coil of the phase to be measured is measured, so that a static location of the permanent-magnet field can be instantaneously detected. Therefore, the rotor can be started by applying two-phase conduction, with 120° rectangular-waves, to the permanent-magnet field in the stationary state, so that the motor can be started from the stationary state, by a closed loop manner, with simple and low-cost drive circuit and control software.

In another method for detecting a magnetic field location in an electric motor, the electric motor further comprises: output means for feeding electricity to the three-phase coils through a three-phase half bridge inverter circuit; control means for storing six conduction patterns, which are forward-direction conduction patterns and reverse-direction conduction patterns for each of the three-phase coils, and field location information for assigning excitation switching sections of 120° conduction corresponding to each of the conduction patterns, and switching-controlling the output means, according to a rotation command from a superordinate controller, so as to change an exciting state; current detecting means for detecting a coil current, the current detecting means being connected to an earth-side terminal of the output means; timer means for measuring a prescribed sensing conduction time from starting to apply sensing conduction to the three-phase coils until a current value reaches a detectable value at which magnetic resistance change caused by magnetic field polarity can be detected; A/D converter means for measuring the coil current value from output of the current detecting means; and the method comprises: a conduction-off step in which all output of the output means to the three-phase coils is blocked immediately before applying the sensing conduction and stored energies stored in all of the coils are released so as to produce a period of a zero current state where the coil current is zero; a measuring step in which the control means sequentially selects one from six conduction patterns using a phase at which one-phase conduction occurs without branching at a neutral point among three-phase coils as a phase to be measured, applies constant-voltage rectangular-wave pulses to the three-phase coils for a prescribed sensing conduction time, measures a peak coil current value immediately before stopping the sensing conduction by the A/D converter means, and stores the same as measurement data; a storing step in which following the forward-direction conduction pattern, a reverse-direction conduction pattern is selected for the phase to be measured, after which the same conduction pattern is repeated for the remaining two phases, measuring the peak coil currents caused by the conduction-off and the sensing conduction is repeated for the six conduction patterns, and the measured peak coil current value immediately before stopping each of the sensing conductions is stored as measurement data, and the control means selects the conduction pattern whose measurement datum is maximum among the measurement data of the six conduction patterns, and identifies the permanent-magnet field location from the field location information corresponding to the maximum conduction pattern.

In the above described method, three-phase sensing pulses (the constant-voltage rectangular pulses) are sequentially applied to the three-phase coils in a stationary state of the motor, and the peak coil current to the coil of the phase to be measured is measured, so that a static location of the permanent-magnet field can be instantaneously detected. Assembling to an existing circuit is easy. Especially, in case of applying to a motor drive circuit having a coil current measuring means, the method can be performed by only changing programs.

In the method, the control means may compare the measurement data of the conduction patterns adjacent to the conduction pattern having the shortest conduction time and divide the field location information of an electric angle of 60°, which is identified from the conduction pattern having the shortest conduction time, into two, whereby the field location information can be identified at every electric angle of 30°.

Further, in the method, the control means may compare the measurement data of the conduction patterns adjacent to the conduction pattern having the maximum peak coil current value and divide the field location information of an electric angle of 60°, which is identified from the conduction pattern having the maximum value, into two, whereby the field location information can be identified at every electric angle of 30°.

In the above described methods, a cross point of the conduction times of the two-phase coils exists at a center of the sections of the permanent-magnet field location information identified of an electric angle of 60°, and a large-small relation is inverted, so that the location of the rotor can be more precisely determined, with a pitch of an electric angle of 30°, by comparing the measurement data of the conduction patterns adjacent to the conduction pattern having the shortest conduction time or by comparing the measurement data of the conduction patterns adjacent to the conduction pattern having the maximum peak coil current value.

In the method, after starting rotation of the rotor having the permanent-magnet field, the sensing may be performed for the two conduction patterns corresponding to the present section and the adjacent section in the rotational direction, and a next boundary point between the exciting sections may be detected by comparing the measurement data of the two patterns.

In the method, after starting rotation of the rotor having the permanent-magnet field, the sensing may be performed for the three conduction patterns corresponding to the present section and the adjacent sections in the forward rotational direction and the reverse rotational direction, and a next boundary point between the exciting sections and the rotational direction may be determined by comparing the measurement data of them.

Preferably, the control means stores six three-phase conduction patterns: a conduction pattern 1, in which the phase W is connected to a plus-side of an electric source, and the phases U and W are connected to the earth-side, and field location information (electric angles 30°-90°); a conduction pattern 2, in which the phases W and U are connected to the plus-side of the electric source, and the phase V is connected to the earth-side, and field location information (electric angles 90°-150°); a conduction pattern 3, in which the phase U is connected to the plus-side of the electric source, and the phases V and W are connected to the earth-side, and field location information (electric angles 150°-210°); a conduction pattern 4, in which the phases U and V are connected to the plus-side of the electric source, and the phase W is connected to the earth-side, and field location information (electric angles 210°-270°); a conduction pattern 5, in which the phase V is connected to the plus-side of the electric source, and the phases U and W are connected to the earth-side, and field location information (electric angles 270°-330°); and a conduction pattern 6, in which the phases V and W are connected to the plus-side of the electric source, and the phase U is connected to the earth-side, and field location information (electric angles 330°-30°).

Advantageous Effects of Invention

By the above method for detecting the magnetic field location in the motor, in the sensorless driving manner, the motor can be started by closed loop control, so applications of sensorless motors, linear actuators, etc. can be expanded. Further, measurement principle is clear, and the driving circuit is simple, so the method can be easily applied to existing circuits.

In comparison with the conventional conduction manner of applying sine-waves having large current values and low frequencies, rectangular pulses having short width time are applied in the present method so that current waves become saw-tooth waves and input energy can be reduced, and a period for rapidly releasing energy can be set, so that a time for detecting an initial location can be highly shortened, e.g., about 1 millisecond.

The sensing conductions, i.e., the forward-direction conduction and the reverse-direction conduction, are continuously performed in one phase, so that minute vibration caused by the sensing conductions can be cancelled, measurement errors caused by the minute vibration can be reduced and highly precise measurement can be realized.

Conventionally, detecting a location of a surface magnet type motor or a slotless motor, in which a salient pole ratio is small, is difficult, but variation of inductance caused by permanent-magnet field polarity is detected in the present method, so that the permanent-magnetic field location of various types of sensorless motors or linear actuators, in the stationary state, can be identified at every electric angle of 60° or 30°.

The measurement can be performed in a low voltage range, e.g., several volts, without reference to a motor driving voltage, the measuring circuit can be constituted by a low voltage circuit, and complex estimating calculation is not required. Therefore, as to the hardware and the software, a low-cost driving circuit can be realized.

By applying the present method to a low speed rotation range when starting the motor, the rotational speed can be increased, by the closed loop control, to the speed at which induced voltage can be detected. Even in case that the rotor is stopped by overload or stopped at the static location, excitation can be continued so that step-out of the rotation can be prevented. Further, the rotor can be rotated in the forward-direction and the reverse-direction, so that reciprocating movement including a butting-and-stopping operation, which cannot be performed by the conventional sensorless driving manner, can be performed.

DESCRIPTION OF EMBODIMENTS

Embodiments of the method for detecting a magnetic field location in an electric motor of the present invention will now be explained with reference to the attached drawings. In the following descriptions, a sensorless motor, which comprises: a rotor having a permanent-magnet field; a stator having coils, which are provided with phase difference of 120° and star-connected to each other; and output means to which phase ends are connected, will be explained as an example of the motor. Note that, the present invention also can be applied to a linear actuator capable of reciprocally moving by a motor.

A method for detecting permanent-magnet field location in a sensorless motor driven by sensorless driving manner, e.g., three-phase brushless DC motor, will be explained with a structure of a sensorless driving unit.

Figure 8:
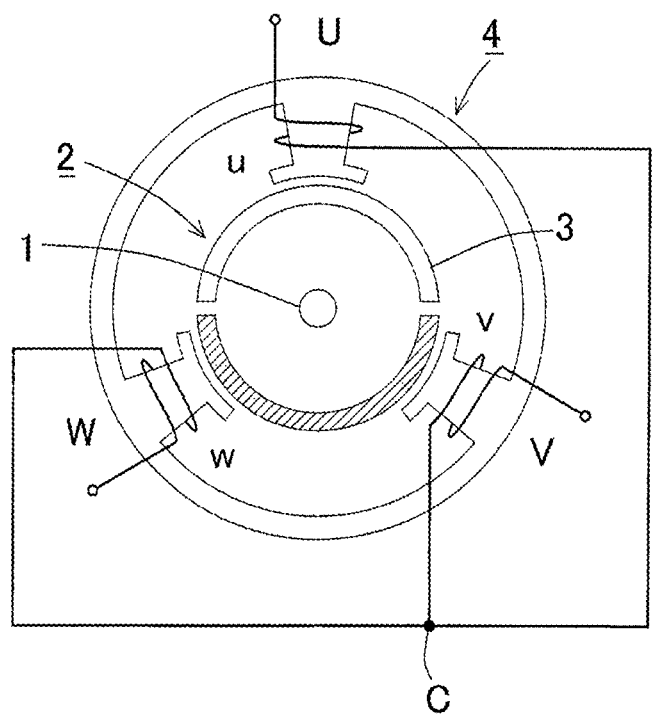
FIG. 8 is a schematic view of a three-phase brushless DC motor in which coils are star-connected.

An example of the three-phase brushless DC motor relating to the present invention is shown in FIG. 8. The three-phase brushless DC motor has a rotor having a two-pole permanent-magnet and a stator 4 having three slots. The motor may be an inner rotor-type motor or an outer rotor-type motor. The permanent-magnet field of the motor may be implanted (IPM-type) or formed on a surface of the permanent-magnet (SPM-type).

In FIG. 8, the rotor 2 is integrated with a rotary shaft 1, and a permanent-magnet 3 is provided as the magnetic field. In the stator 4, pole teeth U, V and W are provided with a phase difference of 120°, and they face the permanent-magnet 3. Coils u, v and w are respectively formed on the pole teeth U, V and W, and the phases are star-connected to each other at a common C, so the stator is connected to a motor driving unit, described later, of the three-phase brushless DC motor. Note that, a common wire is not required, so it is omitted in the drawing.

Figure 7:
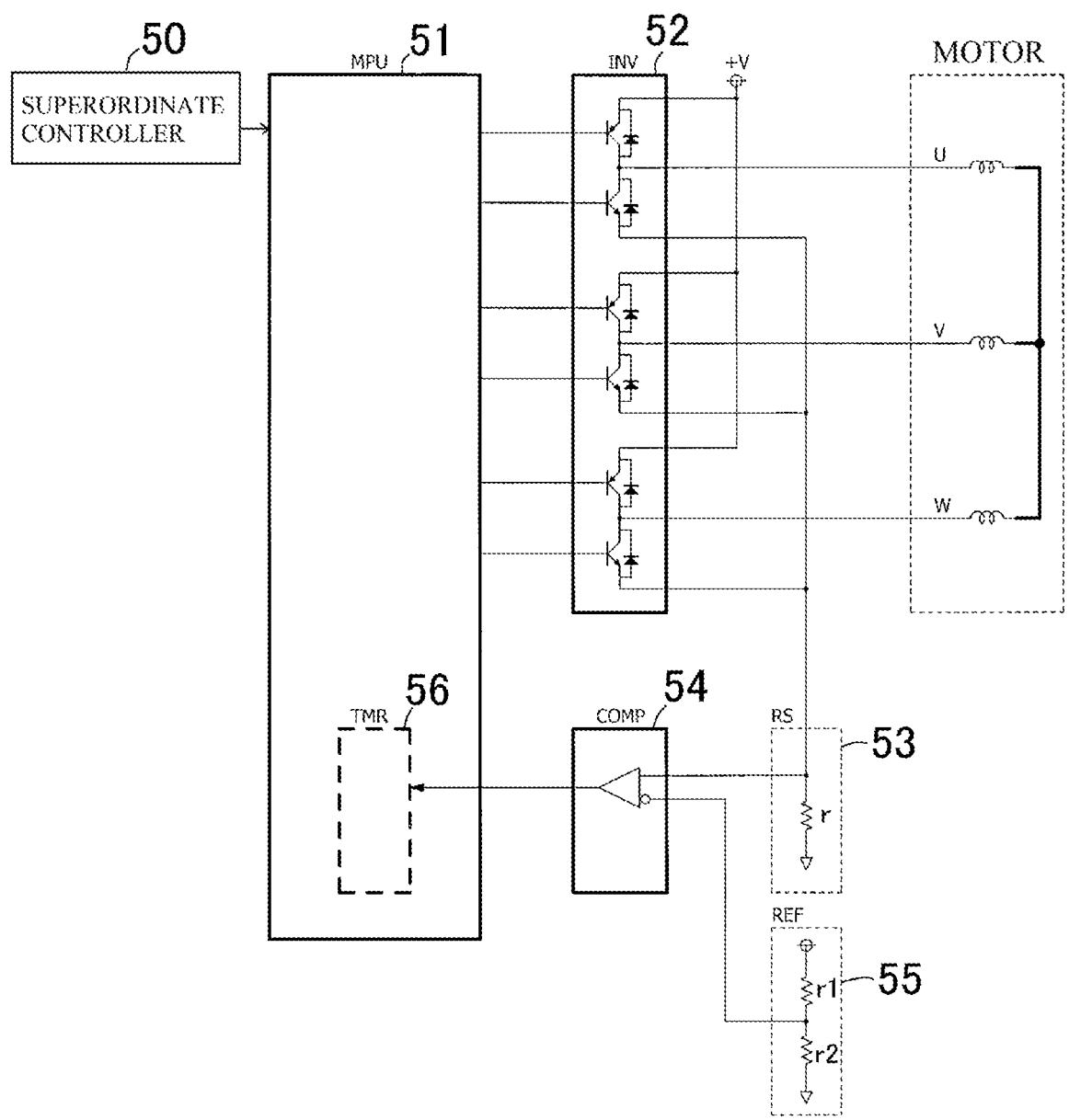
FIG. 7 is an example of a circuit for performing the first method.

Next, an example of the motor driving circuit of the three-phase sensorless motor is shown in FIG. 7.

120° conduction bipolar rectangular-wave excitation is envisioned as a driving manner for starting.

A symbol MOTOR stands for the three-phase sensorless motor. An MPU 51 is a microcontroller (control means). The MPU 51 stores six conduction patterns to be applied to the three-phase coils (U, V and W) and magnetic field location information for assigning excitation switching sections (a section 1 to a section 6) of the 120° conduction, which respectively correspond to the conduction patterns, and switching-controls the output means, according to a rotation command sent from a superordinate controller 50 so as to optionally switch excitation states.

An inverter circuit 52 (INV, output means) applies electricity to the three-phase coils, and performs switching actions, e.g., switching excitation phase for controlling motor torque, PWM control. The inverter circuit 52 includes diodes, which are connected in reverse parallel to a switching element, and half-bridge type switching circuits, which can be optionally connected to a plus-side line of the electric source and an earth line, for three phases are provided.

A current sensor 53 (RS, current detecting means) is serially connected to a common earth-side terminal of the inverter circuit 52. The current sensor 53 is connected to an input terminal of a comparator 54 (COMP, comparator means). Note that, in the present embodiment, a shunt resistance r is employed as the current sensor 53.

A voltage division circuit 55 (REF) generates a reference voltage (a standard voltage value) corresponding to current threshold capable of detecting magnetic resistance change caused by field polarity. An output terminal of the voltage division circuit 55 is connected to a reference-side input terminal of the comparator 54. Note that, in the present embodiment, fixed resistances are used as the voltage division circuit, but a D/A converter may be used, and the current threshold may be optionally set.

Figure 9:
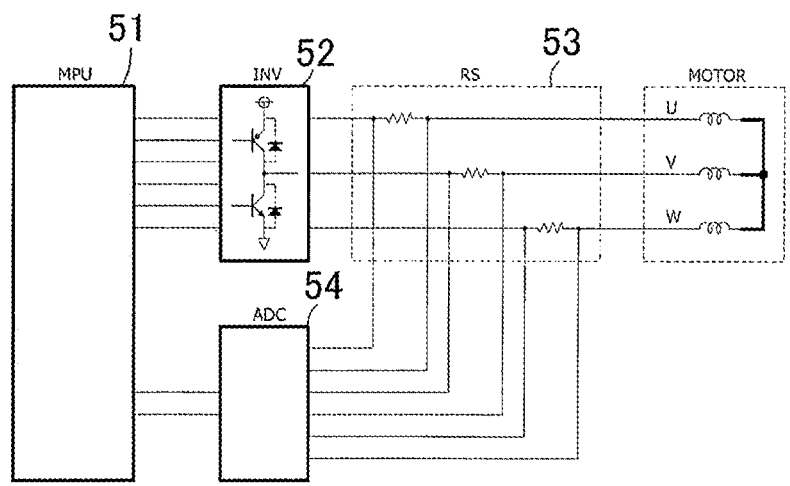
FIG. 9 is a block diagram of the conventional motor driving circuit.
Figure 10:
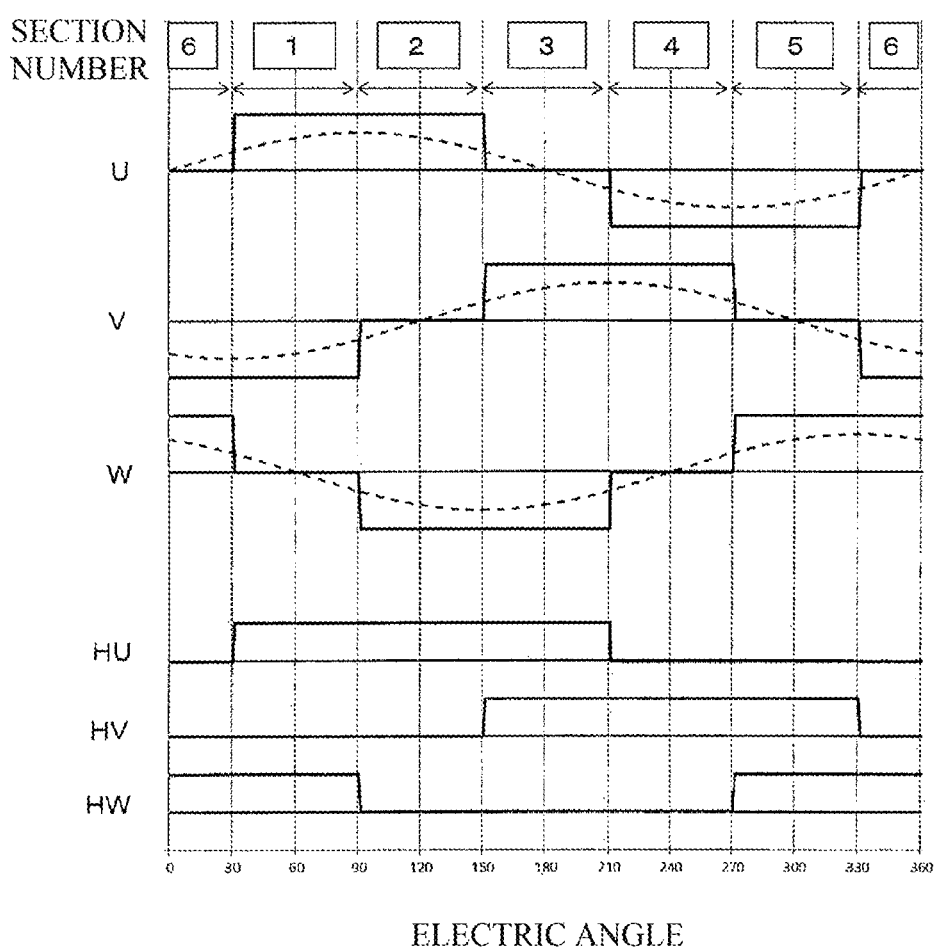
FIG. 10 is a conduction timing chart in which 120° conduction is performed.

In the present embodiment, the conductions applied to the three-phase coils should be simultaneously turned on and off, and peak currents should be detected so as to detect the location of the rotor. Thus, the current sensor 53, in which one shunt resistance r is provided between the common earth-side terminal of the inverter circuit 52 and the earth, is provided instead of the conventional current sensor shown in FIG. 9, in which resistances are respectively serially connected to the coils. Only several volts, which is equal to voltage drop, is applied to the shunt resistance r, so the present driving circuit can be applied to a high voltage driving circuit, in which several hundred volts is applied to coils.

The comparator 54 compares a detecting voltage, which corresponds to the coil current detected by the current sensor 53, with the reference voltage, which corresponds to the current threshold so as to detect if the coil current reaches the current threshold or not. An A/D converter may be used to detect peak current, but the comparator 54, which can easily exhibit high performance, is used. The detecting voltage outputted by the current sensor 53 is inputted to an input terminal of the comparator 54. The reference voltage, which is outputted by the voltage division circuit 55 and corresponds to the current threshold capable of detecting magnetic resistance change caused by field polarity, is inputted to a reference terminal. Output of the comparator 54 is sent to a timer circuit 56 of the MPU 51, and a level changes from L-level to H-level when exceeding the current threshold.

The timer circuit 56 (TMR, timer means) measures a pulse-width time from starting electric conduction by a sensing pulse outputted from the inverter circuit 52 until the coil current reaches the current threshold. The timer circuit 56 is built into the MPU 51 and measures the time from starting the electric conduction by the sensing pulse until the coil current reaches the current threshold. An MPU clock can be used as a measuring clock, so high precision measurement, e.g., 10 nanoseconds order, can be performed, and a wide dynamic range, e.g., 24 bits or more, can be easily obtained. The measurement data are sent to a memory of the MPU 51. The pulse-width time measured by the timer circuit 56 is reset by a reset signal sent from the MPU 51.

The MPU 51 stores the measurement data of the coils to be measured of each phase, which are sent from the timer circuit 56, and detects the location. Concretely, for example, following the forward-direction conduction pattern, a reverse-direction conduction pattern is selected and a current is applied to the phase to be measured, after which the same conduction pattern is repeated for the remaining two phases, whereby the current is applied for all of the six conduction patterns, and the conduction times are stored as the measurement data.

Then, the MPU 51 measures reaching times of the six conduction patters of three-phase conduction, detects the shortest pattern from the shortest measurement datum, and identifies the location of the rotor from the magnetic field location information, which has been previously stored and which corresponds to the shortest pattern.

In the above described embodiment, the current threshold is constant, and the reaching times are measured by the timer circuit 56, but the same effect can be obtained by changing a parameter to make a sensing pulse time constant and measuring a peak current by an A/D converter, and the magnetic field location can be detected, on the same principle, by inverting large-small relations of the measurement data.

Next, the principle of detecting the magnetic field location will be explained.

When applying constant-voltage pulses to a coil, a current value is increased according to the following formula:

$$1(t)=(L/R)*(1-e^{(-t*R/L)})$$

wherein 1 is a coil current, L is coil inductance, and R is coil resistance.

Figure 1:
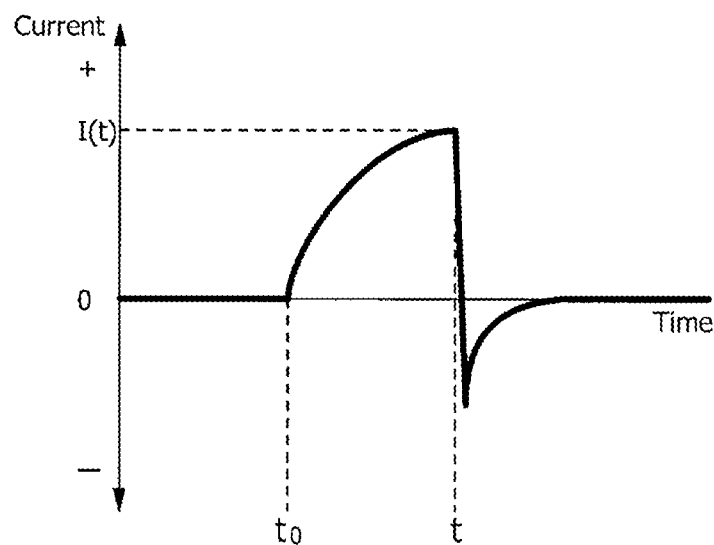
FIG. 1 is a current waveform chart.

A schematic current waveform chart when applying a constant-voltage rectangular pulse to a coil is shown in FIG. 1.

In case that the coil resistance R is constant and a peak current value 1(t) is a prescribed value, a reaching time t from starting conduction $t_0$ until reaching the peak current value 1(t) reflects inductance L. Further, in case that a reaching time t is a prescribed value, the peak current value 1(t) reflects inductance L.

Three-phase conductions patterns of a three-phase motor are as follows:

TABLE 1

| Pattern Number | Phase Connected to Plus-side | Phase Connected to Earth-side |
|---|---|---|
| 1 | U | V, W |
| 2 | V, W | U |
| 3 | V | W, U |
| 4 | W, U | V |
| 5 | W | U, V |
| 6 | U, V | W |

Figure 2:
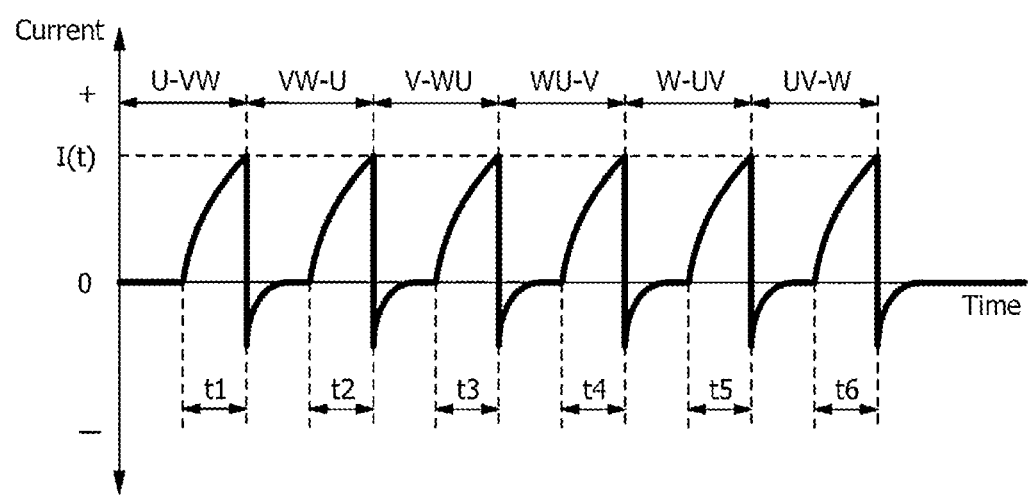
FIG. 2 is a current waveform chart when measuring six conduction patterns.

In a current waveform chart shown in FIG. 2, output-off periods are set for three-phase coils to produce zero coil current states, and one of the above six conduction patterns are sequentially selected and high frequency constant-voltage rectangular pulses are applied thereto. There are two methods for detecting a location of a rotor by applying the sensing pulses: a first method in which the peak current value is a prescribed constant value and the pulse time t is measured; and a second method in which the pulse time t is a prescribed constant value and the peak current value is measured.

Firstly, the first method, in which the peak current value is the prescribed value and the pulse time is measured, will be explained. Times t1 to t6, each of which is a time until reaching a prescribed small current value, are varied according to permanent-magnet field locations due to influence of reluctance. Variation of the reaching time with respect to the permanent-magnet field location has two-periodicity, and the variation of the one phase is approximated by the following formula:

$$\Delta ta = -\cos 2\theta, -\cos(2\theta+\pi)$$

(note, θ=magnetic field location)

The variations for the rest two phases can be obtained by substituting +120° and −120° for θ.

Figure 3:
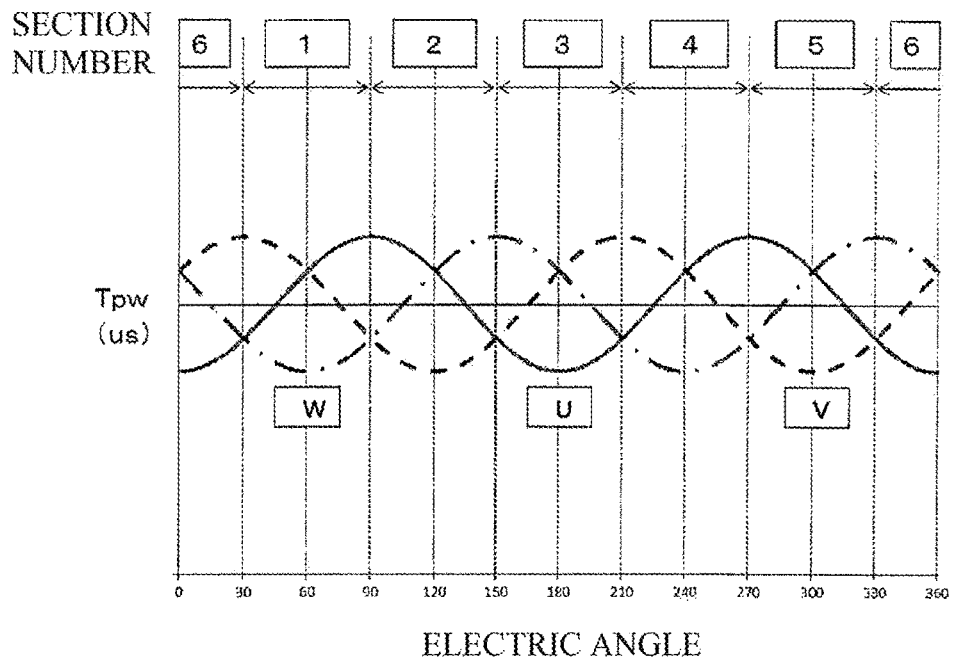
FIG. 3 is a timing chart of reaching times when applying a small current.

Waveforms of the approximate values of the reaching time variations, with respect to the magnetic field locations, when applying the small current are shown in FIG. 3.

As to the times t1 to t6 each of which is a time until reaching a prescribed large current value, magnetic resistance is varied by magnetic polarities, the times are varied according to permanent-magnet field locations. Variation of the reaching time with respect to the permanent-magnet field location has one-periodicity, and the variation of the one phase is approximated by the following formula:

$$\Delta tb = -\cos 2\theta, -\cos(2\theta+\pi)$$

(note, θ=magnetic field location; and Δtb=1 when θ is 0 to π/2 and 3π/2 to 2π)

The variations for the rest two phases can be obtained by substituting +120° and −120° for θ.

Figure 4:
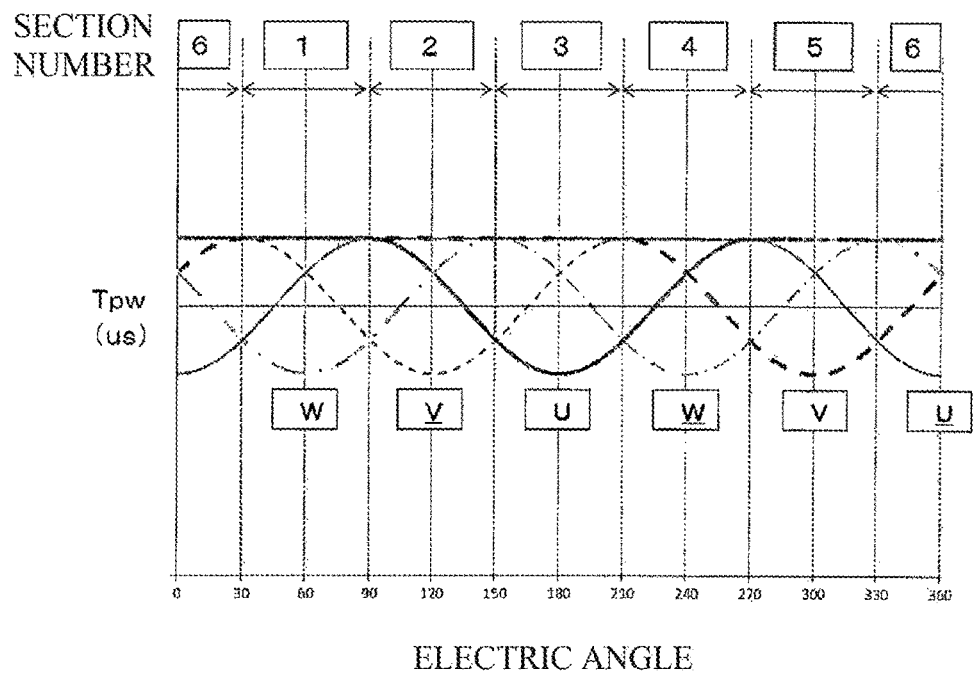
FIG. 4 is a timing chart of reaching times when applying a large current.

Waveforms of the approximate values of the reaching time variations, with respect to the magnetic field locations, when applying the large current are shown in FIG. 4.

When applying the large current, it is thought that the both of the reluctance variation and the magnetic resistance variation are reflected, so the variation of the reaching times is approximate to a formula: Δt=Δta+Δtb.

Figure 5:
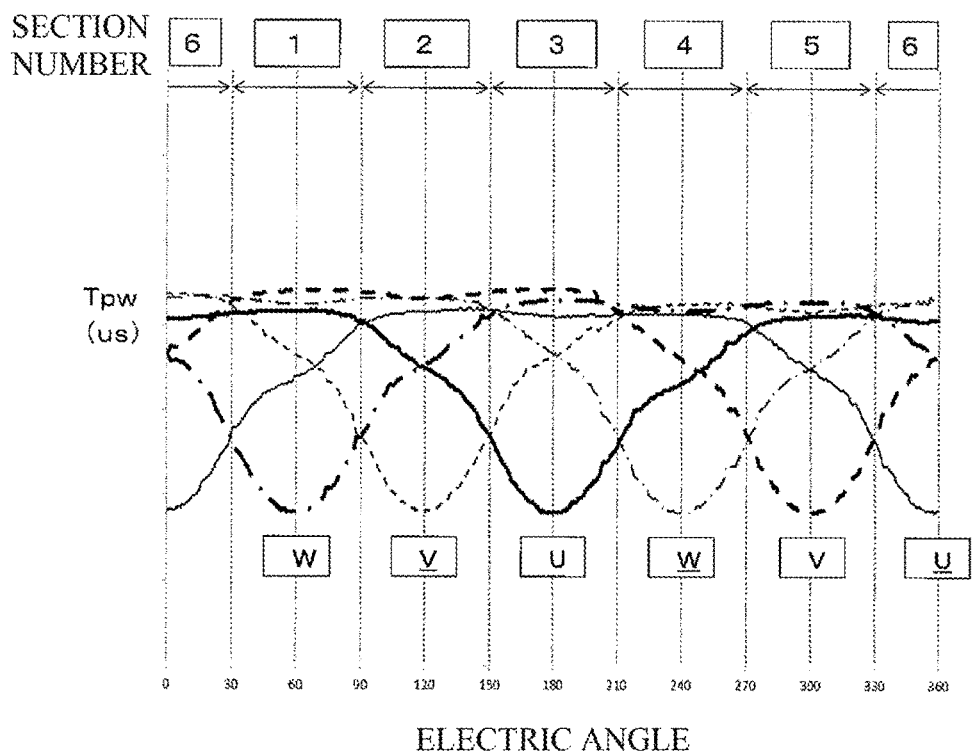
FIG. 5 is an actual timing chart of reaching times, which are measured by a first method, when applying a large current.

Actually-measured waveforms of the variations of the reaching times when applying the large current is shown in FIG. 5. The reaching times until reaching the prescribed current were measured every 1° for the six three-phase conduction patterns, so data of 2160 were plotted. In the drawing, the underlined sections indicate the reverse-direction conductions. In the present example, a spindle motor of a hard disk drive unit was used, and components of the two-periodicity almost never appeared because the magnetic resistance variations exceeded the reluctance variations. In case of motors in which magnetic resistance variations are relatively small, e.g., IPM motor, slotless motor not shown, two-periodicity caused by reluctance variations exceeds, but components of one-periodicity are overlapped, and one maximum peak is sure to appear, so that the location can be detected.

As clearly shown in FIGS. 4 and 5, the conduction pattern whose reaching time is shortest is varied with 60° pitch corresponding to the exciting section. Therefore, if the conduction pattern whose reaching time is shortest is known, the location of the rotor can be uniquely determined, so that the motor can be started by 120° rectangular wave conduction.

A relationship between the shortest conduction patterns and the field location information is shown in TABLE 2. For example, in case that the W-phase is connected to the plus-side of the electric source and the U- and W-phases are connected to the earth-side (minus-side), the shortest conduction pattern is indicated as "W-UV". Further, excitation patterns of the 120° conduction are also shown for reference. When electricity is applied to two-phases with the shown excitation pattern, the motor rotates in the forward direction; when electricity is inversely applied thereto, the motor rotates in the reverse direction.

TABLE 2

| Shortest Conduction Pattern | Field Location Information (Electric Angle) | 120° Excitation Pattern |
|---|---|---|
| W - UV | 30°~90° | U - V (SECTION 1) |
| UW - V | 90°~150° | U - W (SECTION 2) |
| U - VW | 150°~210° | V - W (SECTION 3) |
| VU - W | 210°~270° | V - U (SECTION 4) |
| V - WU | 270°~330° | W - U (SECTION 5) |
| WV - U | 330°~30° | W - V (SECTION 6) |

A manner for detecting the location of the rotor will be concretely explained with reference to TABLE 2.

In the stationary state, electricity is applied to each of the six patterns of the three-phase conduction, and a reaching time until reaching a prescribed current value is measured. Order of the conduction patterns are based on TABLE 1. For example, if the reaching time of the U-VW pattern is shortest, it is detected that the magnetic field locates in a section of an electric angle range of 150°-210°. In this case, the rotor can be rotated in the forward direction by connecting the V-phase to the plus-side of the electric source and connecting the W-phase to the earth-side, i.e., V-W excitation, and then performing the 120° rectangular-wave conduction; on the other hand, the rotor can be rotated in the reverse direction by performing the reverse excitation, i.e., W-V excitation. By the above described manner, the location of the rotor can be easily detected.

Next, the second method, in which the pulse time t is a prescribed value and the peak current value is measured, will be explained. A current increasing rate is large at a location where inductance is small; on the other hand, the current increasing rate is small at a location where inductance is large. Therefore, variation of the current value according to the location of the rotor is oppositely varied with respect to variation of the pulse time when the peak current value of the pulses is constant. The peak current values l1 to l6 when applying short time pluses are varied according to the magnetic field locations due to influence of reluctance. The variation of the peak current value with respect to the magnetic field locations has two-periodicity, and the variation of the one phase is approximated by the following formula:

$$\Delta la = \cos 2\theta, \cos(2\theta+\pi)$$

(note, θ=magnetic field location)

The variations for the rest two phases can be obtained by substituting +120° and −120° for θ.

As to the peak currents l1 to l6 when applying pulses of longer time, magnetic resistance is varied by magnetic polarities, the peak currents are varied according to the magnetic field locations. Variation of the current value with respect to the permanent-magnet field location has one-periodicity, and the variation of the one phase is approximated by the following formula:

$$\Delta lb = \cos 2\theta, \cos(2\theta+\pi)$$

(note, θ=magnetic field location; and Δtb=−1 when θ is 0 to π/2 and 3π/2 to 2π)

The variations for the rest two phases can be obtained by substituting +120° and −120° for θ.

When applying the long pulses, it is thought that the both of the reluctance variation and the magnetic resistance variation are reflected, so the variation of the current variation is approximate to a formula: $\Delta l = \Delta la + \Delta lb$.

Figure 11:
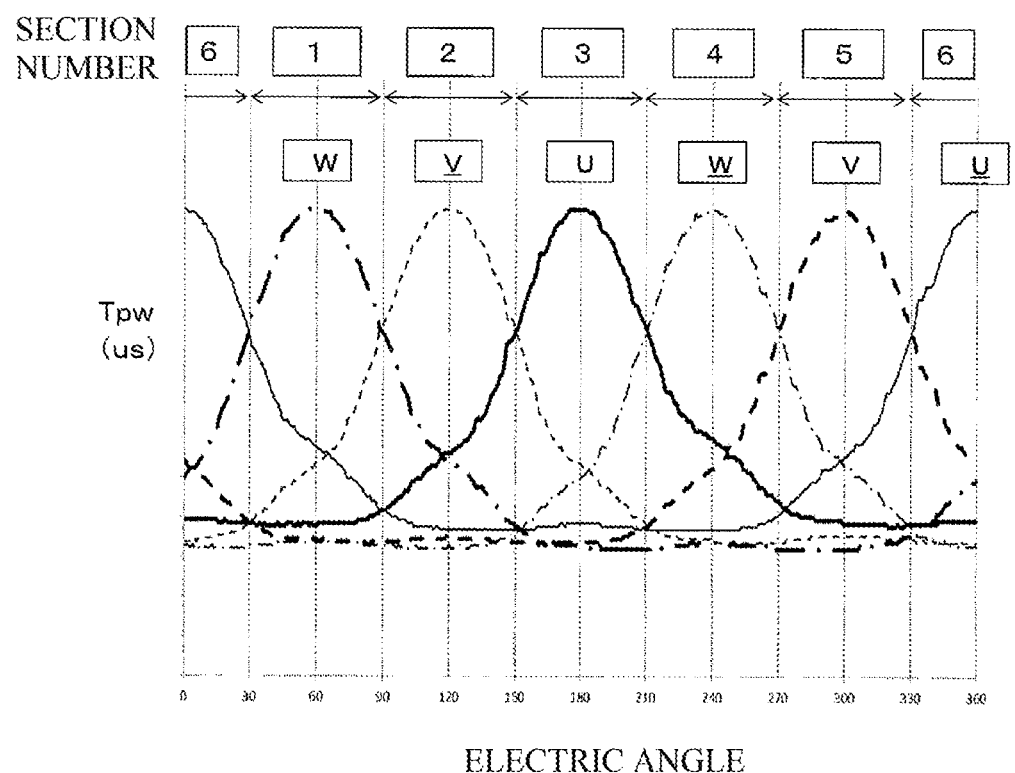
FIG. 11 is an actual timing chart measured by a second method.

Actually-measured waveforms of current variations when applying long pulses is shown in FIG. 11. Peak currents were measured every 1° for the six three-phase conduction patterns, so data of 2160 were plotted. The used motor was the spindle motor of the hard disk drive unit as well as the example shown in FIG. 5.

As clearly shown in FIG. 11, the conduction pattern whose peak current is maximum is varied with 60° pitch corresponding to the exciting section. Therefore, if the conduction pattern whose peak current is maximum is known, the location of the rotor can be uniquely determined, so that the motor can be started by 120° rectangular wave conduction. A relationship between the maximum peak current conduction pattern and the field location information is the same as the relationship of the shortest conduction pattern shown in TABLE 2, so the location of the rotor can be identified by replacing the term "Shortest Conduction Pattern" to "Maximum Peak Current Conduction Pattern".

A manner for detecting the permanent-magnetic field location (the location of the rotor) will be concretely explained with reference to TABLE 2.

In the stationary state, electricity is applied to each of the six patterns of the three-phase conduction, and a peak current value is measured. Order of the conduction patterns are based on TABLE 1.

For example, if the peak current value of the U-VW pattern is maximum, it is detected that the magnetic field locates in a section of an electric angle range of 150°-210°. In this case, the rotor can be rotated in the forward direction by connecting the V-phase to the plus-side of the electric source and connecting the W-phase to the earth-side, i.e., V-W excitation, and then performing the 120° rectangular-wave conduction; on the other hand, the rotor can be rotated in the reverse direction by performing reverse excitation, i.e., W-V excitation.

Further, the location of the rotor can be detected with a pitch of an electric angle of 30°.

Figure 6:
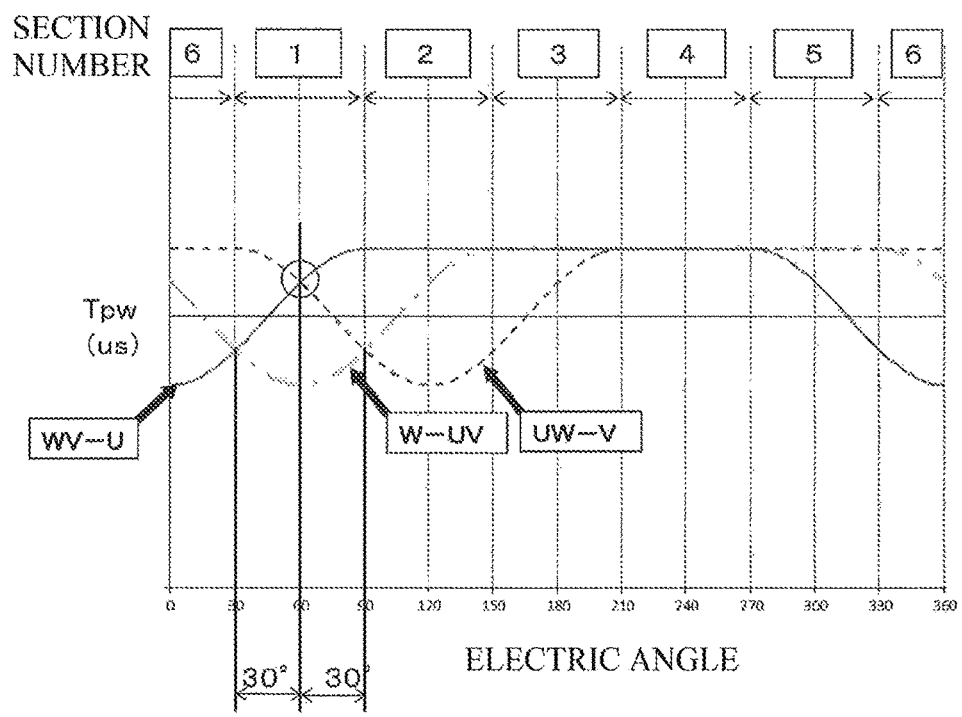
FIG. 6 is a timing chart of reaching times of three patterns.

In FIG. 6, a waveform of the shortest conduction pattern measured by the first method and waveforms of the shortest conduction patterns of anteroposterior sections are shown, but the rest three waveforms are omitted. By identifying the magnetic field location, the shortest conduction patterns of the anteroposterior sections can be determined from TABLE 2. For example, if the measured shortest value is the W-UV pattern, it is detected that the rotor locates in a section of an electric angle range of 30°-90°, so the shortest conduction pattern of the anterior section, i.e., electric angle range of 330°-30°, is WV-U and the shortest conduction pattern of the posterior section, i.e., electric angle range of 90°-150°, is UW-V.

By comparing the reaching times of the shortest conduction patterns in the anteroposterior sections with each other, a cross point exists at an electric angle of 60° which is the center of the present section, so long-short relation is inverted (a part surrounded with a circle shown in FIG. 6). By comparing measured data of the both adjacent shortest conduction patterns, the location of the rotor can be precisely determined at every electric angle of 30°. The required measurement data have been already obtained, so new measurement is not required. In case of performing the second method too, as clearly shown in FIG. 11, the location of the rotor can be precisely determined at every electric angle of 30°, as well as the first method, by comparing the maximum data of the conduction patterns of the both adjacent sections, i.e., anteroposterior sections.

In the present embodiment, the magnetic field location can be detected in not only the stationary state but also a state of rotating at low speed. While rotation, the location of the rotor has been already known, so the sensing need not be performed for the six patterns and the rotation can be continued by only detecting next excitation switching points. The present conduction state is continued until reaching the next excitation switching point, and an excitation sequence is progressed when detecting the excitation switching point.

Further, profiles of the measurement data cross at the excitation switching point. Therefore, the excitation switching point can be detected by periodically performing the sensing for two conduction patterns of the present section and the adjacent section in the rotating direction and comparing the two measurement data obtained. In FIG. 6, for example, in case that the rotor locates in the section 1, i.e., 30°-90°, the conduction pattern of the present section is determined as W-UV from TABLE 2. Further, in case of rotating in the forward direction, the conduction pattern of the adjacent section 2 in the rotating direction is determined as UW-V. By performing the sensing for the two patterns, a large-small relation of the measurement data are inverted when the rotor rotates beyond 90°. Therefore, it is detected that the rotor rotates until reaching the section 2, then the excitation pattern is progressed. Similarly, the switching points of the exciting sections are sequentially detected and the excitation patterns are progressed, so that the motor can be seamlessly started from the stationary state, the low speed rotation can be continued, or stall torque can be continuously generated.

The sensing time should be shortened as much as possible while rotation, but the six conduction patterns in the stationary state can be reduced to the two conduction patterns by using the above described sensing manner, so that the measurement time can be reduced to one third. The measurement time is increased or reduced according to conditions of the motor and the driving circuit, but it is usually about 300 μs.

Further, the rotating direction can be detected by measuring three patterns. The rotating direction is detected by periodically sensing three conduction patterns corresponding to the present section and the adjacent sections in the forward direction and the reverse direction, comparing the measurement data so as to detect next boundary points of the exciting sections in the forward direction and the reverse direction, and determining which boundary point of the exciting section is detected earlier.

In FIG. 6, for example, in case that the rotor locates in the section 1, i.e., 30°-90°, the boundary point of the exciting sections in the forward direction is located at the location of 90°, and it is a cross point of the W-UV conduction pattern and the UW-V conduction pattern. Similarly, the boundary point of the exciting sections in the reverse direction is located at the location of 30°, and it is a cross point of the W-UV conduction pattern and the WV-U conduction pattern. In case that the cross point of 90° in the forward direction is detected prior to the cross point of 30° in the reverse direction, it is determined that the rotor is rotating in the forward direction. On the other hand, in case that the cross point of 30° is detected prior to the cross point of 90°, it is determined that the rotor is rotating in the reverse direction. Therefore, by periodically performing the sensing for the three conduction patterns of the present section and the adjacent anteroposterior sections, the border points between the exciting sections and the rotating direction can be known.

Therefore, the rotating direction is not limited, and the rotor can be rotated in the forward direction and the reverse direction. In case that the rotor is rotated by an external force too, the location of the rotor can be detected, and torque can be generated in optional directions. By using the above described sensing manner, the six conduction patterns in the stationary state can be reduced to the three conduction patterns, so that the measurement time can be reduced to half.

An example of the manner of detecting the location of the rotor by the MPU 51 will be explained with reference to the motor driving circuit shown in FIG. 7 and the current waveforms shown in FIG. 2.

The six three-phase conduction patterns and the permanent-magnet field location information have been previously stored in the memory. The current thresholds have been previously set by the resistance values (r1 and r2) of the voltage division circuit 55. The detection of the location is started by the rotation command from the superordinate controller 50. When starting the detection, all of outputs of the three-phase coils are turned off for a prescribed time. By this action, the coil currents are made zero (a conduction-off step).

Next, the constant-voltage rectangular wave, whose conduction pattern is the prescribed pattern of the three-phase conduction, is applied from the inverter circuit 52 to the three-phase coils, and the measurements are started by the timer circuit 56. The coil current starts flowing. The comparator 54 monitors the outputs until reaching the current threshold. When the coil current increases and the comparator 54 detects that the coil current exceeds the current threshold, the timer 56 stores the measurement data (a measuring step). Note that, when the inverter 52 turns off the conduction to the three-phase coils, the coils release stored energies.

Following the forward-direction conduction pattern, the reverse-direction conduction pattern is selected and the current is applied to the phase to be measured, after which applying the current in the forward- and the reverse-conduction patterns is repeated for the remaining two phases as well, so applying the constant-voltage rectangular pulses for all six conduction patterns and the measurements by the timer circuit 56 are repeated (see FIG. 2). When completing the measurements, the MPU 51 detects the shortest conduction pattern among the six measurement data. The magnetic field location information of the shortest conduction pattern is detected as the location of the rotor, and then the detection is completed.

Upon receiving the start command from the superordinate controller 50, the MPU 51 starts the motor by applying the two-phase 120° rectangular pulses to the three-phase coils through the inverter circuit 52. The inverter circuit 52 selects two phases of the three-phase coils and applies electricity thereto so as to bias the rotor in the rotating direction.

Figure 12:
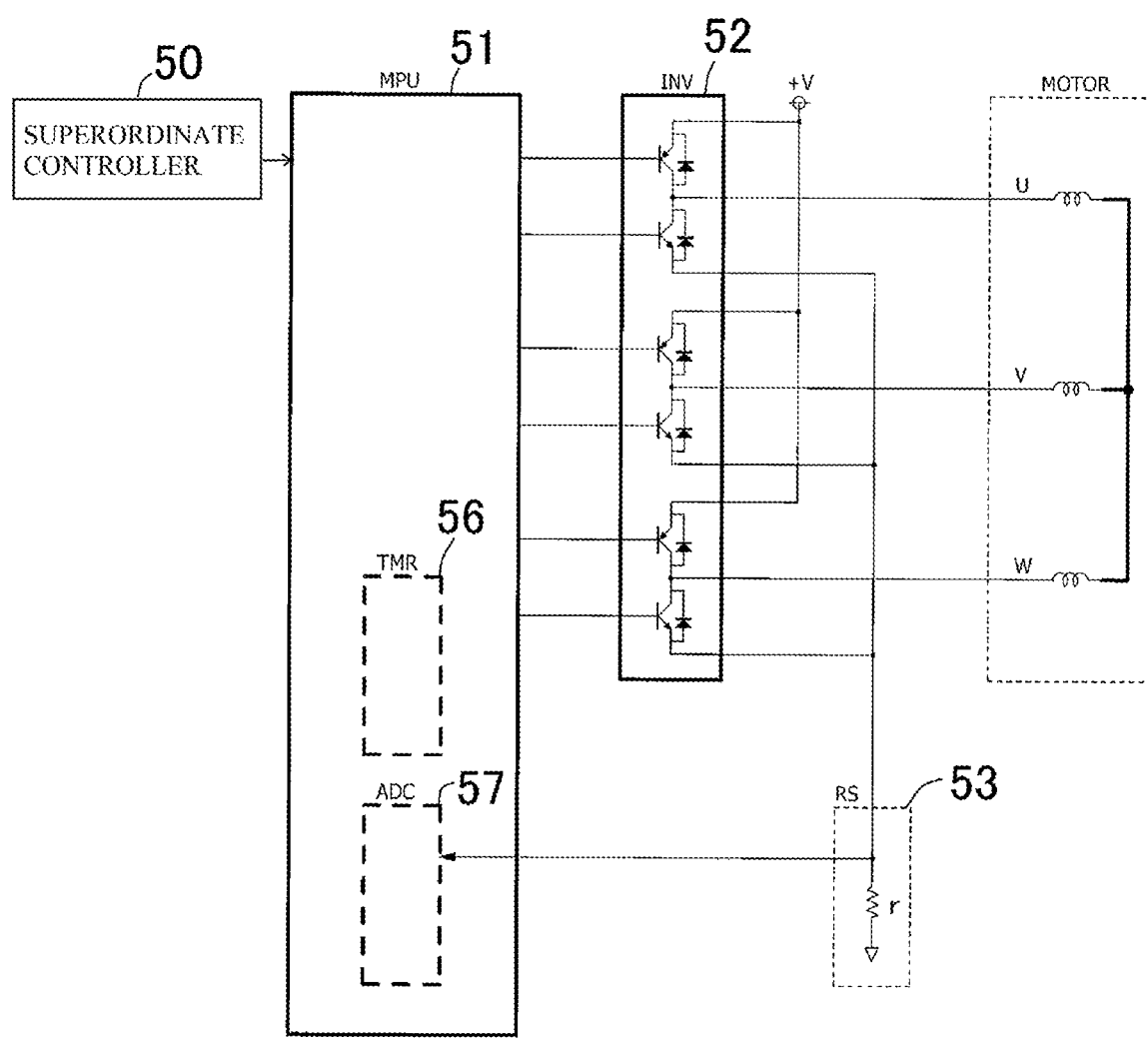
FIG. 12 is an example of a circuit for performing the second method.

Next, an example of a sensorless motor circuit, which performs the second method and in which pulses of a prescribed time are applied and the peak currents of the coils are measured, is shown in FIG. 12. Structural elements shown in FIG. 7 are assigned the same symbols, and explanations of the elements shown in FIG. 7 will be omitted.

Outputs of the current sensor (current detecting means) 53 are sent to an A/D converter 57 (ADC: Analog-to-Digital Converter, analog-to-digital converter circuit, A/D converter means). The A/D converter 57 measures the coil current values from the outputs of the current sensor 53. Further, the timer 56 (TMR, timer means) for measuring conduction times of the sensing pulses is provided. The timer 56 measures elapsing a prescribed conduction time of the sensing pulses. The A/D converter 57 and the timer 56 need not have high performances, so those built into an inexpensive MPU 51 may be used. For example, a 12-bit ADC, whose data acquisition time is about 1 μs and whose converting time is about 20 μs and which is included in commonly used MPU, can be sufficiently used in the present embodiment. Further, a low speed MPU clock, whose frequency is about 10 MHz, may be used as the timer 56. With the above described structure, the peak current values of the six conduction patterns of the three-phase conduction are measured, the maximum pattern is detected from the maximum measurement data, and the field location information, which is previously stored in the MPU 51 and which corresponds to the maximum pattern, is identified as the location of the rotor.

An actual measuring manner will be briefly explained. Firstly, electric conduction to the three phases are turned off until the coil currents reach zero. Next, one conduction pattern is sequentially selected on the basis of TABLE 1, constant-voltage rectangular pulses are applied to the three-phase coils to start the sensing conduction, and the measurement is on standby for a prescribed time. Upon elapsing the prescribed time, the A/D converter 57 measures the coil peak current values from the outputs of the current sensor 53 and stores them as the measurement data. Then, the electric conduction to the three phases are turned off again until the coil currents reach zero.

Following the forward-direction conduction pattern, the reverse-direction conduction pattern is selected and the current is applied to the phase to be measured, after which applying the current in the forward- and the reverse-conduction patterns is repeated for the remaining two phases as well, so applying the constant-voltage rectangular pulses for all six conduction patterns shown in TABLE 1 and measuring the peak coil current values by the sensing conduction are repeated. Then, the MPU 51 detects the conduction pattern having the maximum data among the six measurement data. Next, the magnetic field location information corresponding to the maximum conduction pattern is identified as the location of the rotor on the basis of TABLE 2.

Note that, motor driving circuits and control programs having various structures can be applied to the present invention, so the present invention is not limited to the above described embodiments, and modifications of circuits and programs, which will be obviously performed by electronic circuit engineers and programmers (persons ordinarily skilled in the art) without deviating the scope of the invention, are included in the present invention.

What is claimed is:

1. A method for detecting a magnetic field location in an electric motor, which comprises a rotor having permanent-magnet field and a stator having star-connected three-phase coils and which is started by 120° rectangular-wave conduction supplied from a constant-voltage DC source, the electric motor further comprising:
output means for feeding electricity to the three-phase coils through a three-phase half bridge inverter circuit;
control means for storing six conduction patterns, which are simultaneously performed and which are forward-direction conduction patterns and reverse-direction conduction patterns for each of the three-phase coils, and field location information for assigning excitation switching sections of 120° conduction corresponding to each of the conduction patterns, and switching-controlling the output means, according to a rotation command from a superordinate controller, so as to change an exciting state;
current detecting means for detecting a coil current, the current detecting means being connected to an earth-side terminal of the output means;
comparator means for comparing a detecting voltage corresponding to the coil current detected by the current detecting means with a reference voltage corresponding to a current threshold capable of detecting magnetic resistance change caused by magnetic field polarity so as to detect that the coil current reaches the current threshold; and
timer means for measuring a pulse-width time from starting to apply sensing conduction to the three-phase coils until the coil current detected by the comparator means reaches the current threshold, the method comprising:
a conduction-off step in which all output of the output means to the three-phase coils is blocked immediately before applying the sensing conduction and stored energies stored in all of the coils are released so as to produce a period of a zero current state where the coil current is zero;
a measuring step in which the control means sequentially selects one from six conduction patterns using a phase which is connected to a positive electric source and at which one-phase conduction occurs without having a branch to which no electric current flows, or a phase which is connected to an earth-side electric source and at which one-phase conduction occurs without having a branch from which no electric current flows as a phase to be measured, applies constant-voltage rectangular pulses for sensing to the three-phase coils, uses the timer means to measure a pulse-width time until the coil current detected by the current detecting means reaches the current threshold, and stores the same as measurement data;
a storing step in which following the forward-direction conduction pattern, a reverse-direction conduction pattern is selected and a current is applied to the phase to be measured, after which the same conduction pattern is repeated for the remaining two phases, whereby the sensing conduction is repeatedly applied for all six conduction patterns, and pulse-width times are repeatedly measured and stored as measurement data,
wherein the control means identifies the permanent-magnet field location from the field location information corresponding to the conduction pattern having the shortest conduction time among the measurement data of the conduction times corresponding to the six conduction patterns.

2. The method according to claim 1, wherein the control means compares the measurement data of the conduction patterns adjacent to the conduction pattern having the shortest conduction time, and divides the field location information of an electric angle of 60°, which is identified from the conduction pattern having the shortest conduction time, into two, whereby the field location information can be identified at every electric angle of 30°.

3. The method according to claim 1, wherein after starting rotation of the rotor having the permanent-magnet field, the sensing is performed for the two conduction patterns corresponding to the present section and the adjacent section in the rotational direction, and a next boundary point between is detected by comparing the measurement data of the two patterns.

4. The method according to claim 1, wherein after starting rotation of the rotor having the permanent-magnet field, the sensing is performed for the three conduction patterns corresponding to the present section and the adjacent sections in the forward rotational direction and the reverse rotational direction, and a next boundary point between the exciting sections and the rotational direction are determined by comparing the measurement data of them.

5. A method for detecting a magnetic field location in an electric motor, which comprises a rotor having permanent-magnet field and a stator having star-connected three-phase coils and which is started by 120° rectangular-wave conduction supplied from a constant-voltage DC source, the electric motor further comprising:
output means for feeding electricity to the three-phase coils through a three-phase half bridge inverter circuit;
control means for storing six conduction patterns, which are simultaneously performed and which are forward-direction conduction patterns and reverse-direction conduction patterns for each of the three-phase coils, and field location information for assigning excitation switching sections of 120° conduction corresponding to each of the conduction patterns, and switching-controlling the output means, according to a rotation command from a superordinate controller, so as to change an exciting state;

current detecting means for detecting a coil current, the current detecting means being connected to an earth-side terminal of the output means;

timer means for measuring a prescribed sensing conduction time from starting to apply sensing conduction to the three-phase coils until a current value reaches a detectable value at which magnetic resistance change caused by magnetic field polarity can be detected;

A/D converter means for measuring the coil current value from output of the current detecting means; and the method comprising:

a conduction-off step in which all output of the output means to the three-phase coils is blocked immediately before applying the sensing conduction and stored energies stored in all of the coils are released so as to produce a period of a zero current state where the coil current is zero;

a measuring step in which the control means sequentially selects one from six conduction patterns using a phase which is connected to a positive electric source and at which one-phase conduction occurs without having a branch to which no electric current flows, or a phase which is connected to an earth-side electric source and at which one-phase conduction occurs without having a branch from which no electric flows as a phase to be measured, applies constant-voltage rectangular-wave pulses to the three-phase coils for a prescribed sensing conduction time, measures a peak coil current value immediately before stopping the sensing conduction by the A/D converter means, and stores the same as measurement data;

a storing step in which following the forward-direction conduction pattern, a reverse-direction conduction pattern is selected for the phase to be measured, after which the same conduction pattern is repeated for the remaining two phases, measuring the peak coil currents caused by the conduction-off and the sensing conduction is repeated for the six conduction patterns, and the measured peak coil current value immediately before stopping each of the sensing conductions is stored as measurement data, wherein the control means selects the conduction pattern whose measurement datum is maximum among the measurement data of the six conduction patterns and identifies the permanent-magnet field location from the field location information corresponding to the maximum conduction pattern.

6. The method according to claim 5, wherein the control means compares the measurement data of the conduction patterns adjacent to the conduction pattern having the maximum peak coil current value, and divides the field location information of an electric angle of 60°, which is identified from the conduction pattern having the maximum value, into two, whereby the field location information can be identified at every electric angle of 30°.

7. The method according to claim 5, wherein after starting rotation of the rotor having the permanent-magnet field, the sensing is performed for the two conduction patterns corresponding to the present section and the adjacent section in the rotational direction, and a next boundary point between is detected by comparing the measurement data of the two patterns.

8. The method according to claim 5, wherein after starting rotation of the rotor having the permanent-magnet field, the sensing is performed for the three conduction patterns corresponding to the present section and the adjacent sections in the forward rotational direction and the reverse rotational direction, and a next boundary point between the exciting sections and the rotational direction are determined by comparing the measurement data of them.

* * * * *